(12) United States Patent
Clark et al.

(10) Patent No.: US 7,040,253 B1
(45) Date of Patent: May 9, 2006

(54) HORSE TRAILER INTERIOR PARTITION LATCHING SYSTEM

(75) Inventors: John Clark, Mustang, OK (US); Paul Charlton, Minco, OK (US)

(73) Assignee: Universal Trailer Corporation Horse?Livestock Group, Greenwich, CT (US)

( * ) Notice: Subject to any disclaimer, the term of this patent is extended or adjusted under 35 U.S.C. 154(b) by 113 days.

(21) Appl. No.: 10/826,600

(22) Filed: Apr. 16, 2004

Related U.S. Application Data

(60) Provisional application No. 60/463,852, filed on Apr. 18, 2003.

(51) Int. Cl.
*B60P 3/04* (2006.01)

(52) U.S. Cl. .......................... 119/412; 119/523; 49/411

(58) Field of Classification Search ................ 119/412, 119/523, 516, 473, 522, 524; 49/410, 411; 292/258; 16/90, 96 R
See application file for complete search history.

(56) References Cited

U.S. PATENT DOCUMENTS

| | | | | |
|---|---|---|---|---|
| 2,815,543 A | * | 12/1957 | Gates | 49/411 |
| 2,929,115 A | * | 3/1960 | Beckstrom | 49/411 |
| 3,703,244 A | * | 11/1972 | Walsh et al. | 414/500 |
| 3,741,529 A | * | 6/1973 | Blagg | 256/26 |
| 4,049,311 A | * | 9/1977 | Dietrich et al. | 410/138 |
| 4,168,933 A | * | 9/1979 | Kane | 414/498 |
| 4,236,747 A | * | 12/1980 | Ratliff | 296/24.4 |
| 4,821,680 A | * | 4/1989 | Smith et al. | 119/524 |
| 5,887,928 A | * | 3/1999 | Fenske | 296/24.31 |
| 6,895,897 B1 | * | 5/2005 | Culp et al. | 119/412 |
| 6,904,869 B1 | * | 6/2005 | Geisthardt | 119/524 |

* cited by examiner

*Primary Examiner*—Yvonne R. Abbott
(74) *Attorney, Agent, or Firm*—Martin G. Ozinga; Phillips, McFall, McCaffrey, McVay&Murrah, P.C.

(57) ABSTRACT

The present invention essentially comprises an upper assembly having a securing receptor with a guide track, a lower assembly having a securing receptor with a guide track, a bi-fold partition having a top portion and a bottom portion wherein the top portion is received by the upper assembly and the bottom portion is secured by the lower assembly. In a preferred construction, the bottom portion of the partition further has a cooperatively attached pin or foot bolt that is generally received by the lower assembly. When the partition is secured in such a fashion, the partition forms a compartment often referred to as a tack room. To release the partition, the pin is pulled in upward direction and the partition slid out of the lower and upper assembly wherein the partition can be folded and stored along the sidewall of the trailer and in essence removes the tack room sub-compartmentalization.

8 Claims, 8 Drawing Sheets

HORSE TRAILER INTERIOR PARTITION LATCHING SYSTEM

CROSS-REFERENCE TO RELATED APPLICATIONS

Priority is claimed from provisional application U.S. Ser. No. 60/463,852 filed on Apr. 18, 2003, and incorporated by reference herein.

BACKGROUND OF THE INVENTION

1. Field of the Invention

The present invention relates to hinged partitions used in livestock trailers such as but not limited to horse trailers. In general, the present partition latch system is related to devices such as may be used to secure hinged partitions which divide the interior of the horse trailer for separating compartments for horses, equipment and so forth. And more particularly, the present invention provides a means to secure a multi-hinged tack room partition with use of one hand in a single operation.

2. Description of the Prior Art

Trailers, such as commonly found in association of horses and other livestock, are frequently configured to accommodate various numbers of animals in a relatively secure fashion during transportation. To wit, many trailers have movable and securable partitions for taking the area inside the trailer and compartmentalizing the space into desirable areas which may then maximally utilize the given trailer interior floor space.

Frequently, horse trailers position horses across and generally at a diagonal in the trailer such that a rear corner space is optimally designed for storage of equipment associated with horses, often referred to as tack. Hence, it is known to provide a partition which separates a rear corner into a tack room. Furthermore, due to the utility nature of these types of trailers, it is known to take this tack room partition and construct it in a manner wherein the partition can be folded along the side of the trailer, removed, or otherwise repositioned such that the rear corner of the trailer may be used for other purposes. This allows the trailer to be more multifunctional, easier to clean, and provide flexibility of configuration and compartmentalization of the interior.

In the known prior art, partitions throughout the trailer are generally spaced to provide a cubical or stall for a horse to stand which will support the horse and help prevent it from falling or stumbling when the trailer is being moved. It is common for a horse to lean or fall against a partition or event to push and kick the partitions thereby exerting significant force on the partition's latching mechanism. Tack room partitions, therefore, must also provide a sturdy means to hold a horse in a relatively fixed manner on one side of the partition as well as keep the defined tack room space separate such that the horse does not have access to the contents of the tack room.

Also of note, these partitions may include other sets of hinges for generally folding the partition so that it may be collapsed and stored along the sidewall of the trailer. It is known in the art that such partitions may act and be constructed very much like a typical bi-fold door found in residential construction of closets and so forth, but without a guiding track for the distal end. In essence, these partitions are free swinging multiple hinged panels or sets of panels with a first end connected to the sidewall with a hinge and the distal end usually secured or aligned with the center of the rear doors by pins.

Some prior art tack room partitions have used a set of spring loaded bolts to position the partition. Typically the distal end of the partition is secured by a spring activated or biased pin or bolt at the bottom of the partition and another such pin or bolt located at the top of the partition when the partition is in place forming the tack room. The non-distal end is often hinged to the sidewall of the trailer.

These prior art pins or bolts slip into or are generally received by holes or apertures formed in the interior of the trailer with the top pin sliding into a positioning hole in the top or roof of the interior of the trailer and likewise the bottom pin sliding into a hole at the bottom or floor of the interior of the trailer. It is known to place these respective holes in the rear panel frame that generally forms the back portion of the trailer and may include a door or gate structure for letting animals load and unload out of the back of the trailer.

In operation, the tack room partition is swung into position by rotating on the hinge attached to the sidewall. Once the distal end is positioned such that the partition encloses a corner formed by the sidewall and the back wall, the partition distal end is secured by positioning the pins over their respective holes and sliding the set of pins into therein.

Unfortunately, this operation is often cumbersome due to the nature of the construction of the free swinging distal end. As noted above, the distal end is not tracked like typically found in residential construction of closets. Therefore, the user must steady the partition in the desired location without any mechanical assistance and slide the top pin and the bottom pin into a relatively small hole without much clearance.

The operation is further complicated by the size of the partition. The user must first align the partition, hold it in place, slide one pin and then reach to the opposite end to slide the other pin. Although the floor mounted pin is typically constructed such that a user may kick the spring loaded pin into position into the receptacle, the user must still reach the top pin by hand. Needless to say, short or young users frequently can not reach the top pin without assistance of a stool, ladder, or stepping into the tack compartment. Likewise, it is not always easy to see if the pin is properly secured.

Due to this inherit concern, it is not unusual for individuals to fail to secure the top portion of the partition. This may pose a severe safety problem during transportation of the animal as well as create a hazard to the user who mistakenly believes the partition is secured.

Of note, while it is important that the partition latching system is easy to position, it is also of utmost importance that the partition is secured in a stable fashion. Currently, there are no known partitions generally used in association with tack rooms that provide a single step process to align the distal end to a back of the trailer and a convenient means of securing the aforementioned.

Although there are numerous trailer designs and features, the prior art has failed to bridge the gap between user wants and currently available products. Likewise, there is a desire to improve the operation and utilization of tack room partitions. Therefore, an extensive opportunity for design advancements and innovation remains where the prior art fails or is deficient.

SUMMARY OF THE INVENTION

In view of the foregoing disadvantages inherent in the known types of latching systems now present in the prior art, the present invention provides a single handed latch construction for securing a swinging partition wherein the same can be utilized reliably in those situations where dependability, safety, and ease of operations are desired. As such, the general purpose of the present invention, which will be described subsequently in greater detail, is to provide a new and improved partition latching system which has all the advantages of the prior art devices and none of the disadvantages.

To attain this, the present invention essentially comprises an upper assembly having a securing receptor with a guide track, a bottom assembly having a securing receptor with a guide track, a bi-fold partition having a top portion and a bottom portion wherein the top portion is received by the upper assembly and the bottom portion is secured by the lower assembly. In a preferred construction, the bottom portion of the partition further has a cooperatively attached pin or foot bolt that is generally received by the lower assembly. When the partition is secured in such a fashion, the partition forms a compartment often referred to as a tack room. To release the partition, the pin is pulled in an upward direction and the partition slid out of the lower and upper assembly wherein the partition can be folded and stored along the sidewall of the trailer and in essence removes the tack room sub-compartmentalization.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved partition latching system which may be easily and efficiently manufactured and marketed.

It is a further object of the present invention to provide a new and improved partition latching system which is of a durable and reliable construction.

An even further object of the present invention is to provide a new and improved partition latching system which is susceptible to a low cost of manufacture with regard to both materials and labor, and which accordingly is then susceptible to low prices of sale to the consuming public, thereby making such latch economically available to the buying public.

Still another object of the present invention is to provide a new and improved partition latching system which provides all of the advantages of the prior art, while simultaneously overcoming some of the disadvantages normally associated therewith.

Another object of the present invention is to provide a new and improved partition latching system having a guide system for aligning and securing the distal portion of the partition in a one step operation.

Another object of the present invention is to provide a new and improved partition latching system which may be used with a single band and is easy to operate regardless of the user's height.

An even further object of the present invention is to provide a partition latching system with simplified operation and few parts than the prior art.

These, together with other objects of the invention, along with the various features of novelty which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
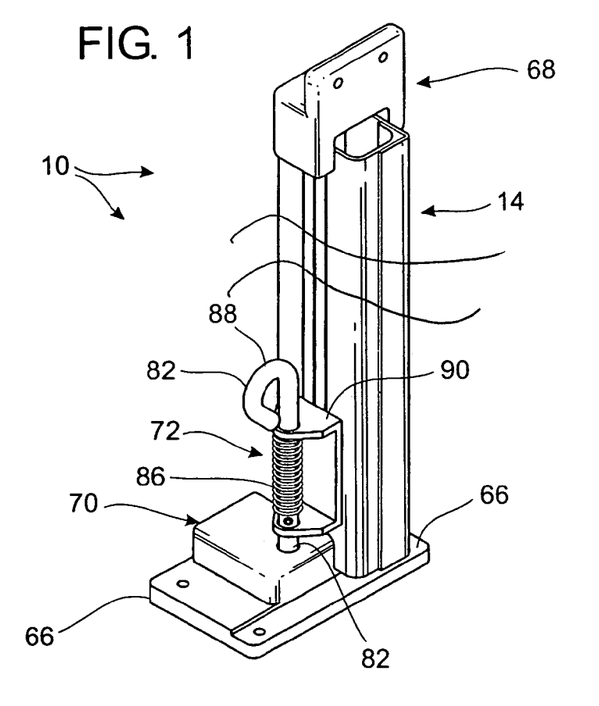
FIG. 1 is a general perspective depiction of a preferred embodiment of the invention wherein the partition segment is not drawn to relative scale.
Figure 2:
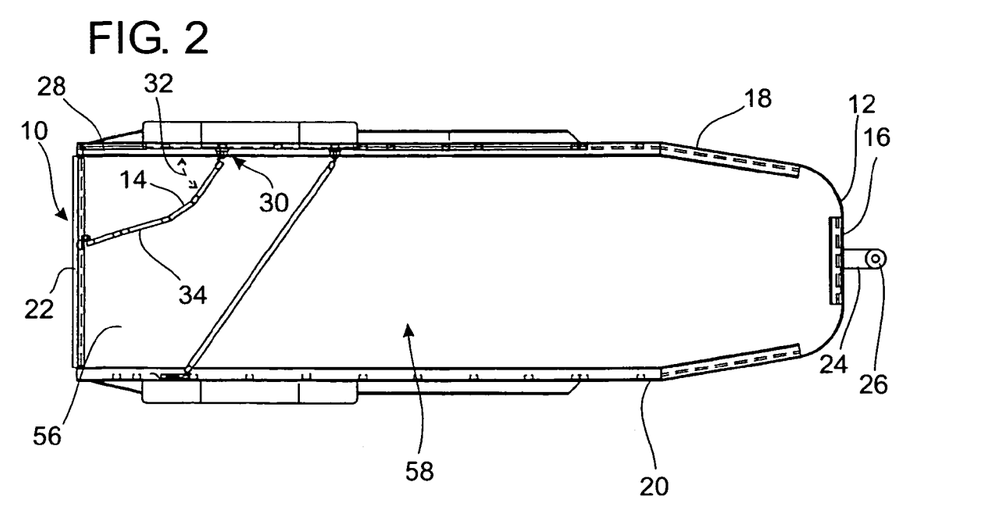
FIG. 2 is a partial top view of a horse trailer with the present invention showing a tack wall partition in a closed position.

Referring to the drawings in detail and to FIGS. 1 and 2 in particular, reference character 10 generally designates a new and improved partition latching system constructed in accordance with the present invention. Partition latching system 10 is generally provided for trailer 12 having a hinged partition 14 which is typical of a trailer used for livestock and more specifically horses.

It is contemplated that partition latching system 10 may further be used in association with other types of trailers other than livestock, such as but not limited to cargo trailers, car hauilers, storage systems, and so forth. Furthermore, invention 10 could also be utilized in non-trailer related applications such as but not limited to stock pens, barns stalls, and livestock loading ramps. Likewise, invention 10 may be used with applications unrelated to livestock or trailers.

Trailer 12 generally depicts a typical layout for a slant load horse trailer having a front 16, a left side 18, a right side 20, and a rear 22. It is understood that orientation of right side, left side, front and rear is for convenience and should not be considered limiting. Trailer 12 front 16 includes means for attaching the trailer 12 to a towing vehicle (not shown), in this case, the trailer 12 includes a tongue 24 with a hitch 26.

It is further contemplated that invention 10 may be utilized in larger trailers that commonly utilize a goose-neck hitch in place of the tongue 24 and hitch 26 as shown. It is still further contemplated that the present invention, partition latching system 10, can be used in self-propelled vehicles that may have one or more partition 14. It is also understood that invention 10 may be used with a plurality of partitions 14 in livestock carriers and the illustrations depicting a preferred embodiment should not be considered to be limiting. Furthermore, it is still further understood that the arrangement of partition 14 in trailer 12 may be of various and numerous configurations and the depicted embodiment is for purposes of illustration.

As generally depicted in the illustrations, partition 14 is hingedly mounted to trailer 12 sidewall 28 such as left side 18 by one or more hinges 30. In this way, partition 14 may generally pivot along hinges 30 along arc 32 such that partition 14 may be in a closed position 34 or in an open position 36 (not shown). It is understood that when partition 14 is in the generally closed position 34, a compartment 38 is formed at the rear 22 of trailer 12 along corner 40. Compartment 38 may generally be used for storing equipment, tack, feed, and other various and sundry items.

Figure 4:
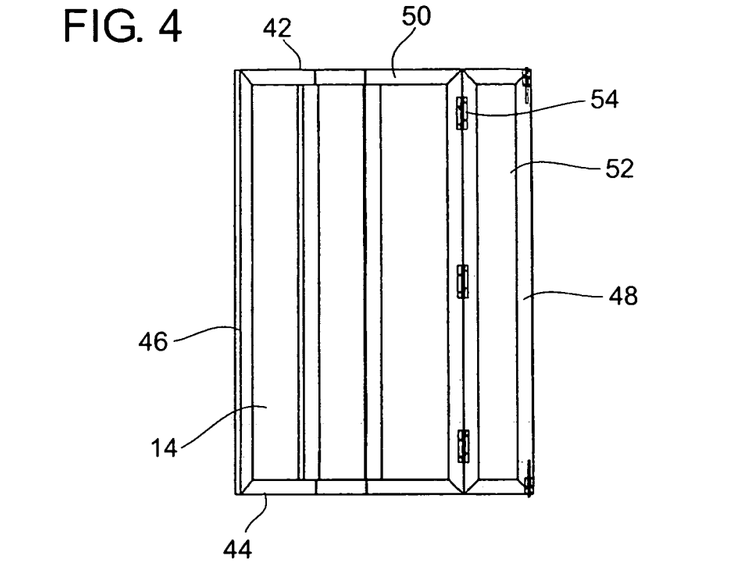
FIG. 4 is a side view generally depicting a partition in accordance with a preferred embodiment of invention.

In a preferred construction as shown in FIG. 4, partition 14 comprises a top portion 42, a bottom portion 44, a sidewall mounting portion 46, and a second or distal end 48. It is understood that partition 14 may be of a solid piece construction or of construction of a plurality of panels, such as but not limited to a first panel 50 and a second panel 52. It is known in the art to provide partitions 14 that have multiple panels hingedly connected such as found on bi-fold doors. It is understood that partition 14 may be made of numerous configurations with a preferred embodiment having a first panel 50 and a second panel 52 connected by hinges 54. Such configuration leads to utilization of space by allowing the partition 14 to be folded in a manner that can be tied, connected, or removably attached to the sidewall 28. This allows compartment 38 to be essentially eliminated wherein a larger area 56 is created in the interior 58 of trailer 12.

Figure 3:
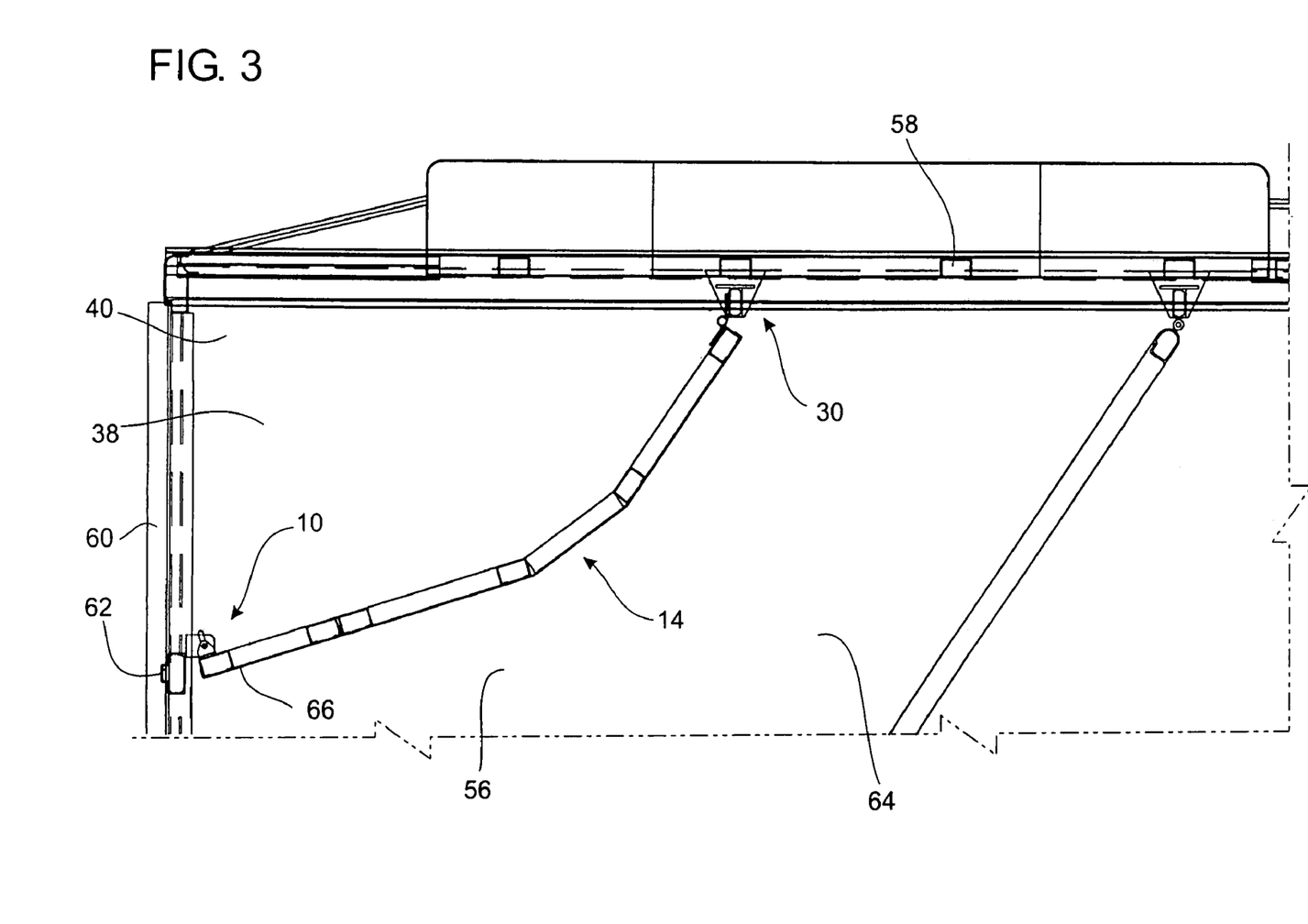
FIG. 3 is a general partial top plan view of FIG. 2 of a horse trailer with the present invention showing a tack wall partition in a closed position.

Partition 14 has sufficient length and is located along the right side 20 such that when the partition 14 is in the closed position 34, distal end 48 of the partition 14 is held in place at the rear 22 of trailer 12. As shown in FIG. 3, partition 14 distal end 48 generally meets back wall 60 with a preferred construction being approximately a middle 62 of back wall 60. It is understood that back wall 60 is generally configured to swing, move, reposition, or open such that the interior 58 is accessible and wherein tack room compartment 38 is further accessible. Likewise, livestock may be placed in area 64 through such access point.

In a preferred construction, partition 14 may contact trailer 12 back wall 60 in a generally perpendicular manner. It should be noted that the partition 14 may be mounted in a reverse manner so that it is hingedly connected to the opposite side of sidewall 28. It should also further be noted that partition 14 may have numerous angles of contact in different preferred embodiments while in closed position 34 and as such a preferred embodiment is depicted for purposes of illustration but should not be considered limiting. Furthermore, it is understood that partition 14 may be removably attached to trailer 12.

When partition 14 is in closed position 34, partition 14 distal end 48 interlocks with a latch assembly 66. Latch assembly 66 prevents partition 14 from moving. In addition, this interlocking may generally add structural strength to trailer 12.

As shown in latch assembly 66 generally includes an upper housing 68, a lower housing 70, and a pin assembly 72 generally mounted on partition 14. It is understood that upper housing 68 and lower housing 70 may be integrally formed with trailer 12 or be of a separate construction wherein the aforementioned are welded, bolted, screwed, riveted, or otherwise affixed to trailer 12.

Furthermore, upper housing 68 and lower housing 70 may be constructed from plastic, rubber, metal, or other natural and synthetic materials. It is contemplated that partition 14 may be made from metal such as but not limited to aluminum and thus further contemplated that due to the interaction of partition 14 with upper housing 68 and lower housing 70, the later mentioned are of a softer material. In a preferred construction ultra high molecular weight, also referred to as U.H.M.W., plastic may be utilized. Such is found to not mark, scar, or otherwise mar the aluminum or other materials used in partition 14.

Figure 5:
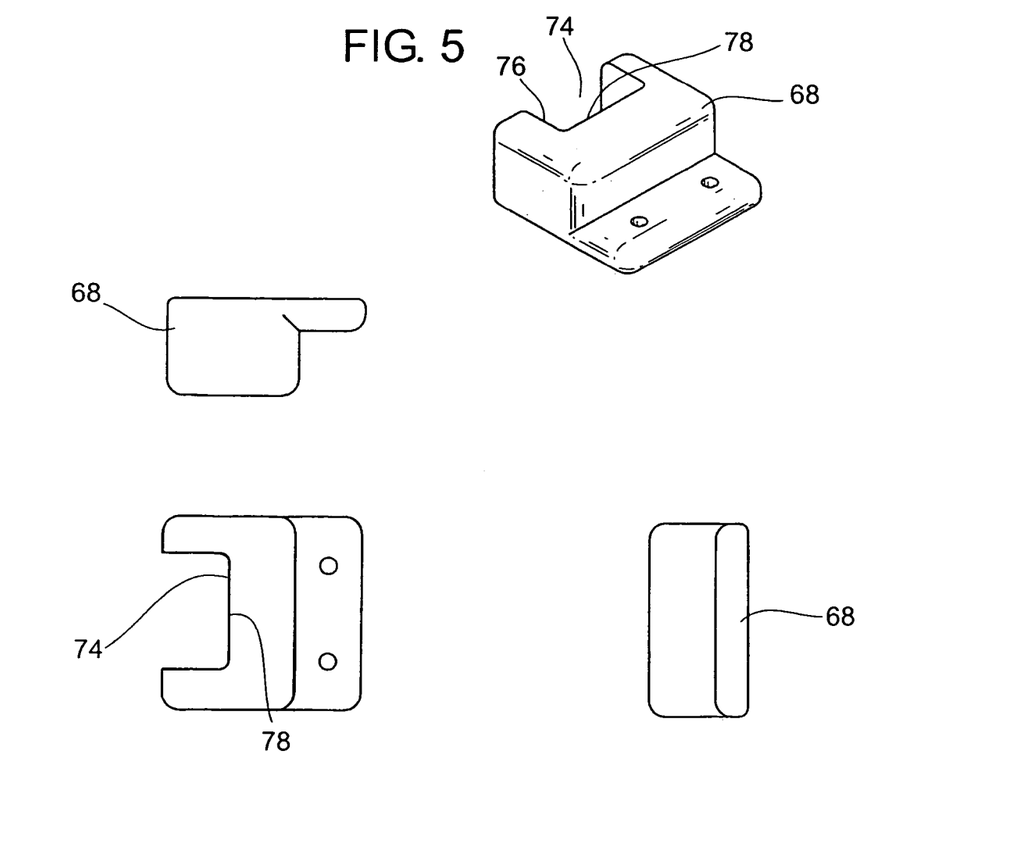
FIG. 5 is a perspective view of an upper housing in accordance with a preferred embodiment of invention.

In a preferred embodiment, upper housing 68 is generally a U shaped bracket with a securing receptor 74 that generally receives, communicates, or holds partition 14 distal end 48 top portion 42. It is further contemplated that an upper guide track 76 may be provided for generally lining up the distal end 48 top portion 42 of partition 14 while it travels fully into the securing receptor 74. Still furthermore, it is contemplated that upper housing 68 may include a stop 78 for limiting the travel of the partition 14 after it has reached a desired position.

Figure 6:
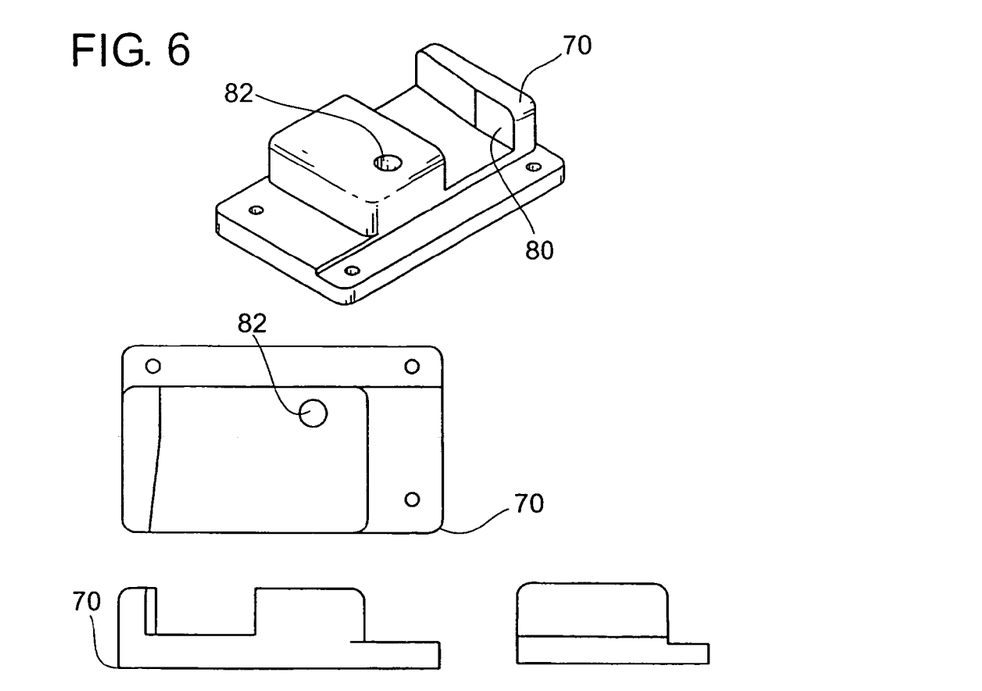
FIG. 6 is a perspective view of a lower housing in accordance with a preferred embodiment of invention

In accordance with a preferred construction of invention 10, lower housing 70 is generally shaped like a channel, bracket, or the like and generally receives, communicates, or holds partition 14 distal end 48 bottom portion 44. As shown in FIG. 6, it is further contemplated that a lower guide track 80 may be provided for generally lining up the distal end 48 bottom portion 44 of partition 14 while it travels fully into position. Lower housing 70 may further include securing receptor 74 aperture 82 for communicating, connecting or generally cooperating with pin assembly 72 which will be discussed in greater detail below.

Figure 7:
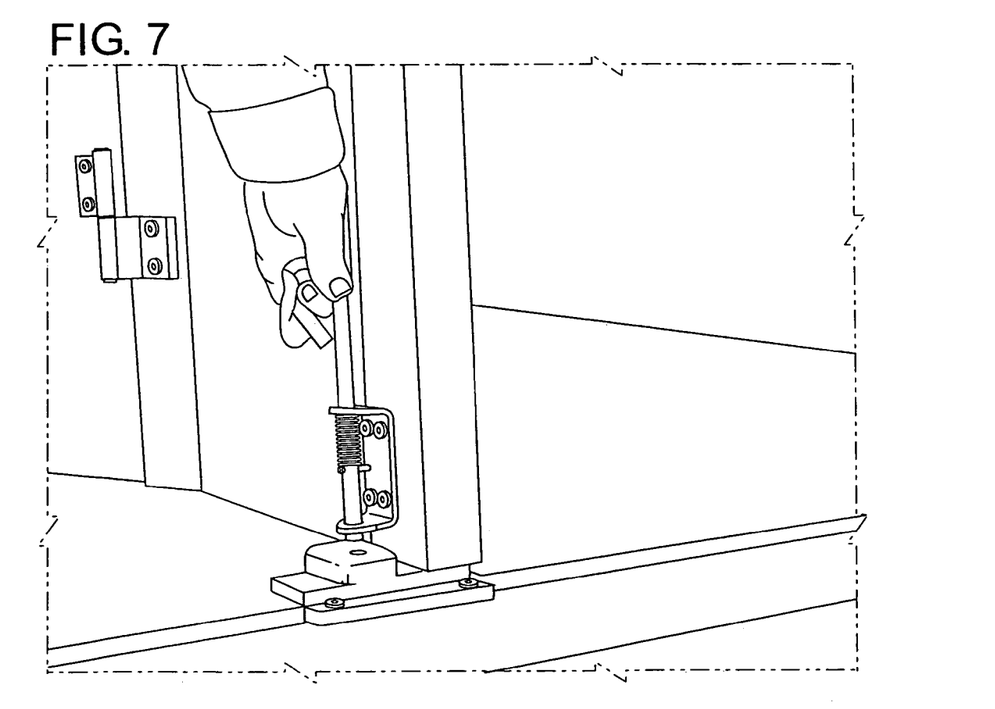
FIG. 7 is an illustration of a preferred embodiment of the invention generally depicting a user operating pin assembly.
Figure 8:
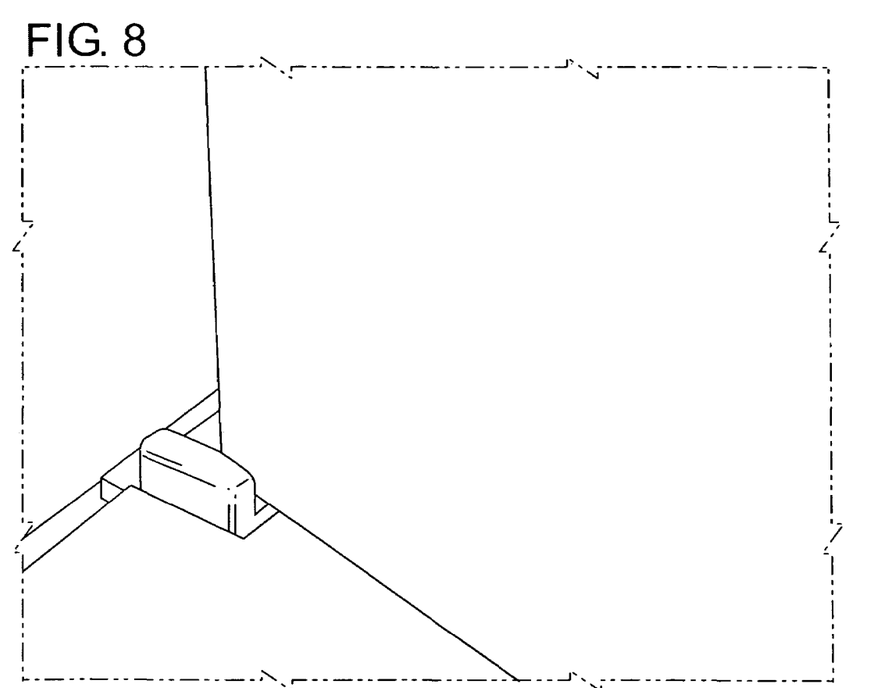
FIG. 8 is a perspective view of a preferred embodiment of the invention generally depicting a bottom portion of a partition entering the lower assembly.
Figure 9:
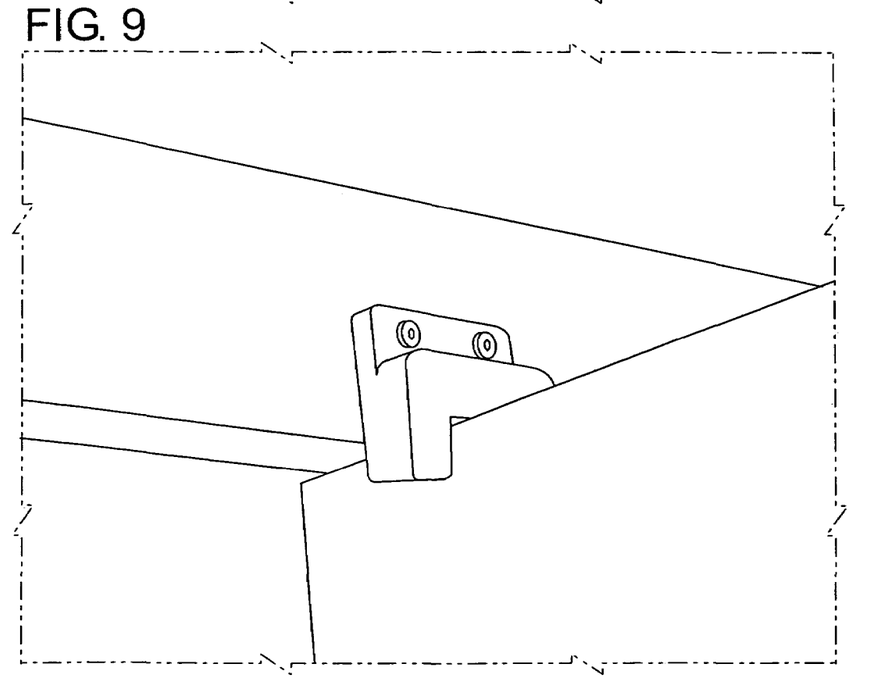
FIG. 9 is a perspective view of a preferred embodiment of the invention generally depicting a top portion of a partition inserted into the upper assembly.
Figure 10:
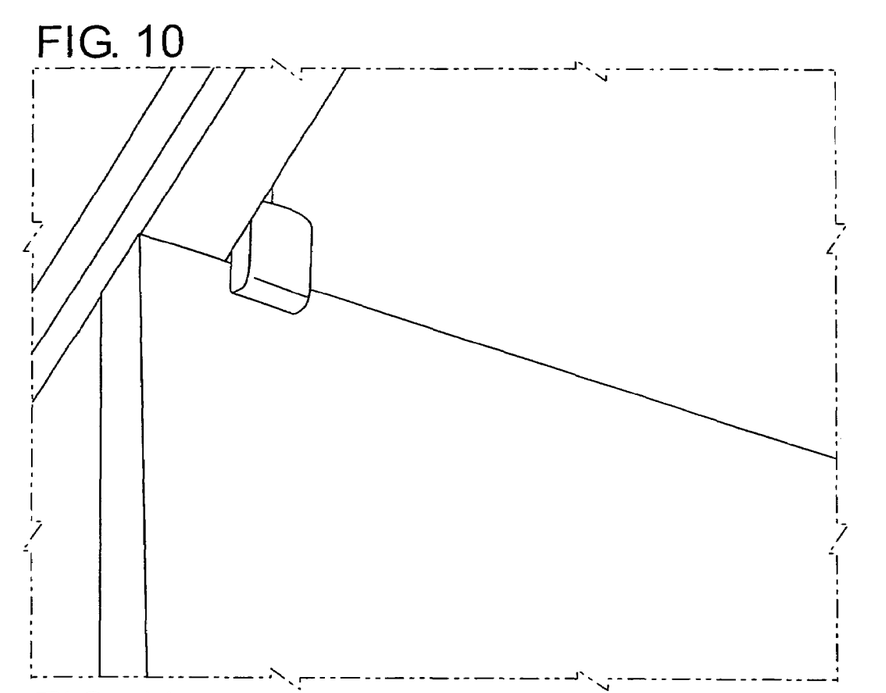
FIG. 10 is another perspective view of a preferred embodiment of the invention generally depicting a top portion of a partition inserted into the upper assembly.
Figure 11:
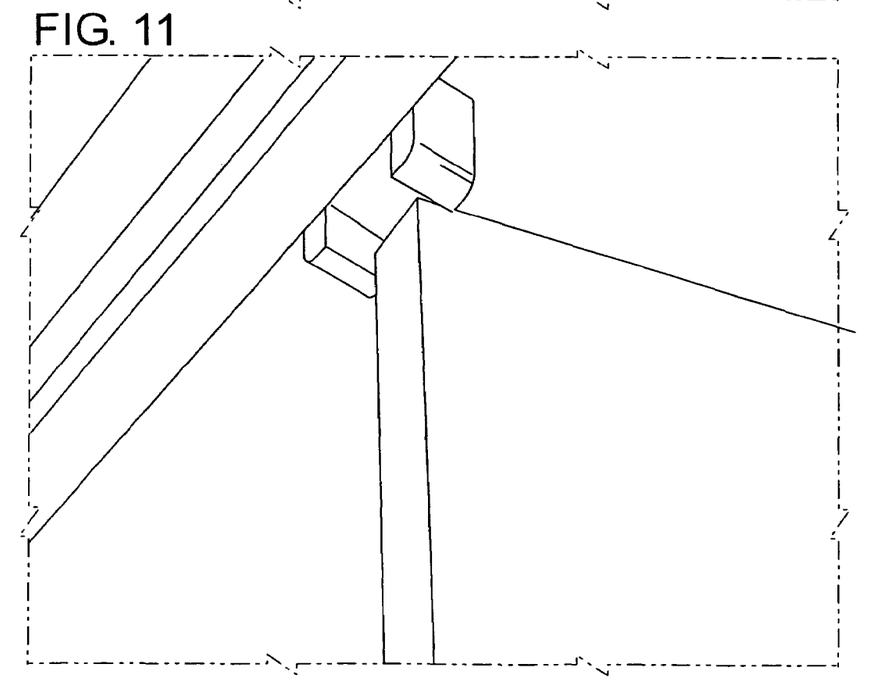
FIG. 11 is another perspective view of a preferred embodiment of the invention generally depicting a top portion of a partition being inserted into the upper assembly.
Figure 12:
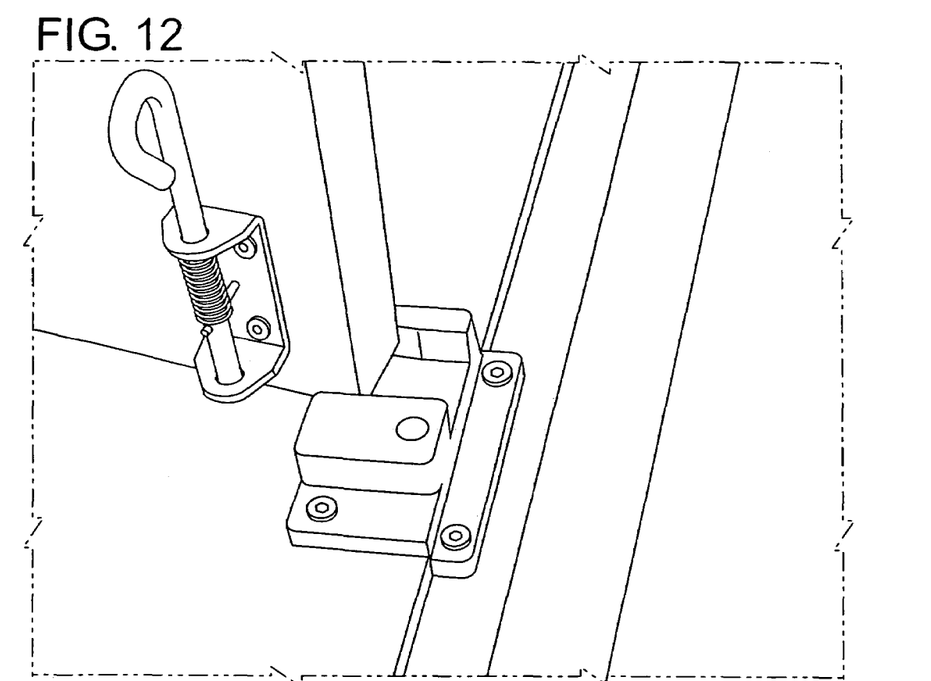
FIG. 12 is a perspective view of a preferred embodiment of the invention generally depicting a bottom portion of a partition being inserted into the lower assembly with the pin in the up position.
Figure 13:
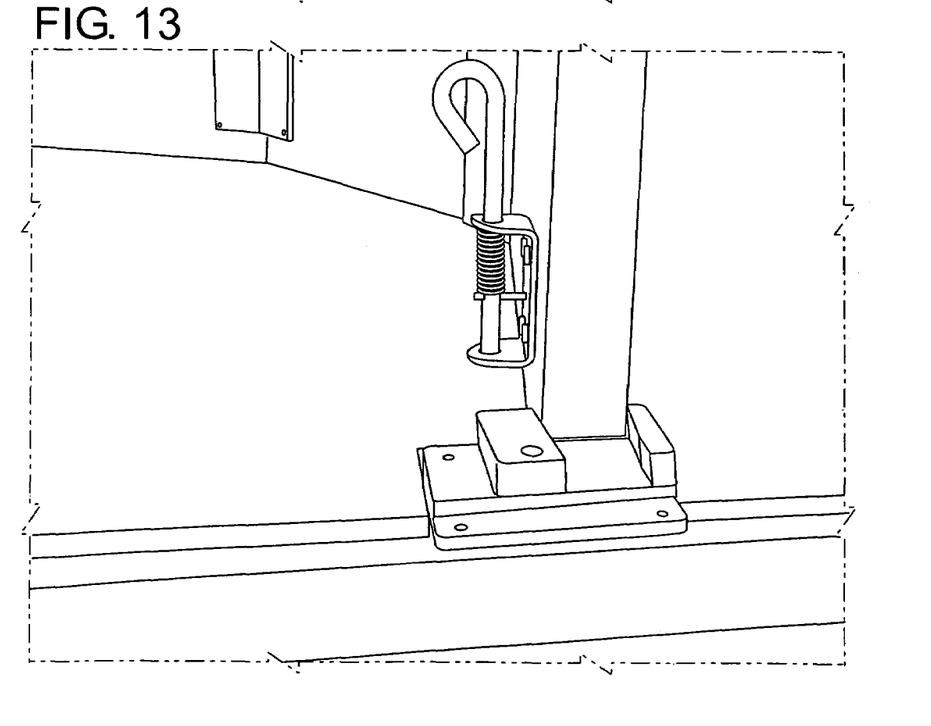
FIG. 13 is another perspective view of a preferred embodiment of the invention generally depicting a bottom portion of a partition being inserted into the lower assembly with the pin in the up position.
Figure 14:
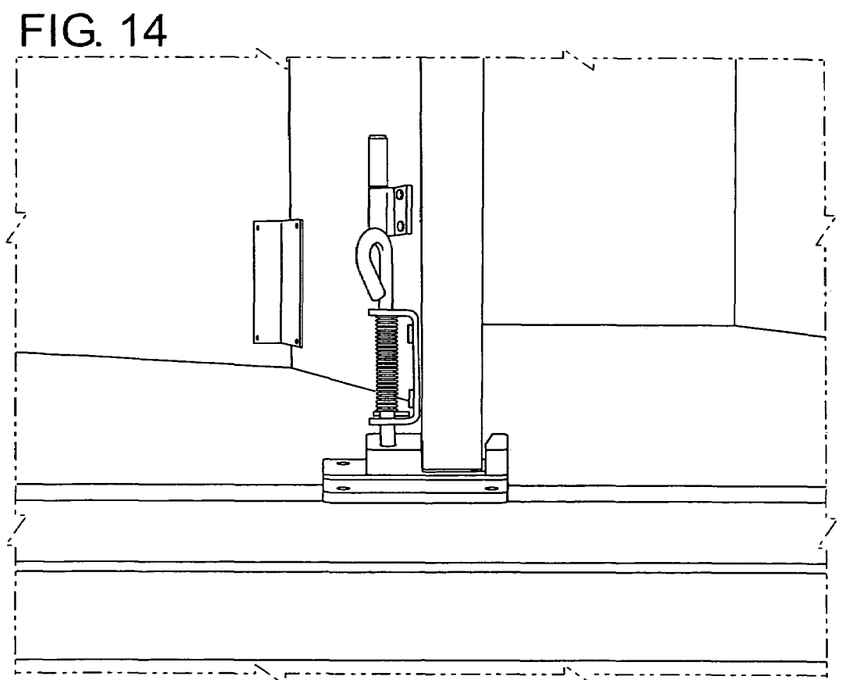
FIG. 14 is perspective view of a preferred embodiment of the invention generally depicting a bottom portion of a partition inserted into the lower assembly and the pin communicating with the lower housing.
Figure 15:
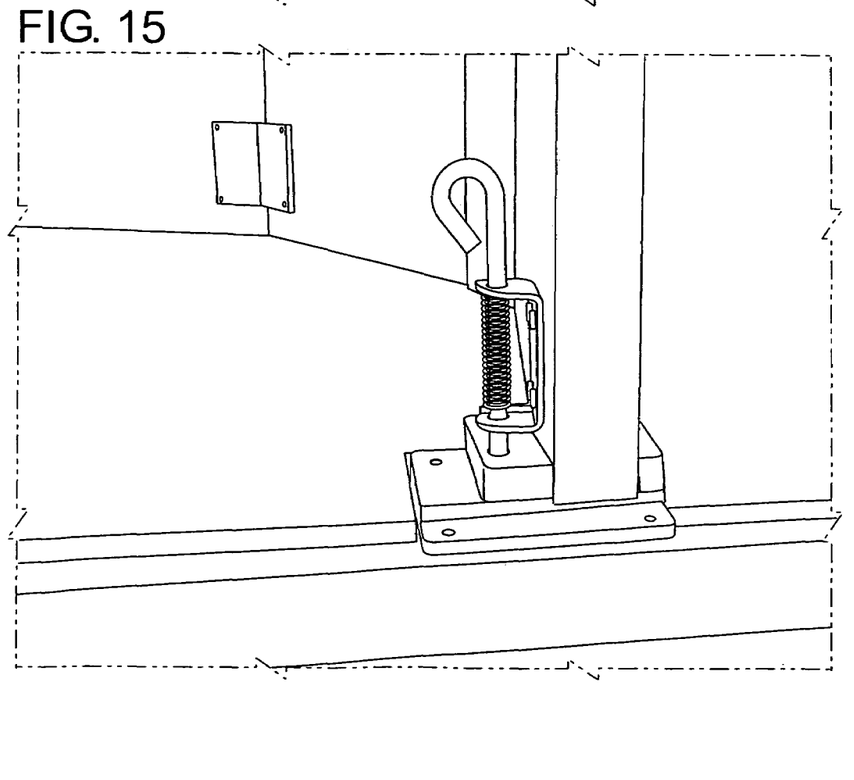
FIG. 15 is another perspective view of a preferred embodiment of the invention generally depicting a bottom portion of a partition inserted into the lower assembly and the pin communicating with the lower housing.

In a preferred construction, partition 14 may include the pin assembly 72 generally located on the bottom portion 44 near or on the distal end 48 for securing the partition 14 in closed position 34. Pin assembly 72 may include a downwardly spring biased pin 84 with spring 86 and may include handle 88. Pin 84 may generally slide into aperture 82. Pin assembly 72 may further include bracket 90 that may be attached to partition by bolting, welding, riveting, screwing or otherwise attaching.

A preferred construction may provide a partition latch system for a trailer having an interior surface defined by a front, a first sidewall, a back, a second sidewall, a floor, a roof and a partition having a first end and a second end with a top portion and a bottom portion and wherein said partition first end is hingedly attached to said trailer first sidewall, said latch system comprising: an upper housing attached to said interior roof of said trailer for receiving said partition second end top portion; a lower housing having a guide track and an aperture wherein said lower housing is attached to said interior of said trailer floor for receiving said partition second end bottom portion ;and a pin assembly attached to said partition second end bottom portion that communicates with said aperture of said lower housing for securing said partition second end in said interior of said trailer.

Further, a preferred construction may include a pin assembly is that is spring biased, the upper housing and said lower housing are made from plastic, the partition is further comprised of multiple panels hingedly connected the upper housing is a U shaped bracket, the partition is made from aluminum, the partition second end may further be secured to said trailer first sidewall, and the trailer is a horse trailer.

IN OPERATION

To position partition 14 into the closed position 34 forming tack compartment 38, user may grasp handle 88 of pin assembly 72 and generally pull the partition 14. As partition 14 reaches the desired position, top portion 42 of distal end 48 will generally enter upper housing 68. Upper guide track 76 may be utilized for generally lining up the distal end 48 top portion 42 of partition 14 while it travels fully into the securing receptor 74. Partition 14 will stop travel when reaching stop 78.

Likewise, while the above operation is conducted, user moves partition 14 to lower guide track 80 which may generally receive the distal end 48 bottom portion 44 of partition 14 while it travels fully into closed position 34. It is understood that user may generally line up the bottom portion 44 with lower housing 70 and upper housing 68 will generally automatically line up with top portion 42. Hence, the user will only need to look at and move the bottom portion 44 into lower housing 70. It is contemplated that the user may perform the aforementioned operation with a single hand.

After partition 14 is generally aligned in the closed position 34, pin assembly 72 should be approximately aligned whereas pin 84 is positioned directly over aperture 82 of lower housing 70. User may now release the pin 84 such that spring 86 forces the pin 84 downward to engage, communicate, receive, or enter aperture 82 thereby securing partition 14.

To move partition 14 from closed position 34, user simply pulls pin 84 upwardly such that pin 84 disengages or is removed from aperture 82, thus allowing the partition 14 to be backed out from the upper housing 68 and lower housing 70 simultaneously. It is contemplated that the user may perform the aforementioned operation with a single hand. Partition 14 may not be secured, stored or removed out of the way such that compartment 38 generally is no longer a separate area in trailer 12.

In a preferred method, a tack room is provided or formed for a trailer having an interior surface defined by a front, a first sidewall, a back, a second sidewall, a floor, a roof and a partition having a first end and a second end with a top portion and a bottom portion and wherein said partition first end is hingedly attached to said trailer first sidewall, and wherein said trailer further includes an upper housing attached to said interior roof of said trailer for receiving said partition second end top portion; a lower housing having a guide track and an aperture wherein said lower housing is attached to said interior of said trailer floor for receiving said. partition second end bottom portion ;and a pin assembly attached to said partition second end bottom portion that communicates with said aperture of said lower housing for securing said partition second end in said interior of said trailer, comprising the steps: grasping said pin assembly with one hand; guiding said partition second end bottom portion into said lower housing via said guide track; and connecting said pin assembly to said aperture of said lower housing securing said partition and forming said tack room.

Changes may be made in the combinations, operations, and arrangements of the various parts and elements described herein without departing from the spirit and scope of the invention. Furthermore, names, titles, headings and general division of the aforementioned are provided for convenience and should, therefore, not be considered limiting.

We claim:

1. A partition latching system for a trailer having an interior surface defined by a front, a first sidewall, a back, a second sidewall, a floor, a roof and a partition having a first end and a second end with a top portion and a bottom portion and wherein said partition first end is hingedly attached to said trailer first sidewall, said latching system comprising:

an upper housing attached to said interior roof of said trailer for receiving said partition second end top portion;

a lower housing having a guide track and an aperture wherein said lower housing is attached to said interior of said trailer floor for receiving said partition second end bottom portion ;and a pin assembly attached to said partition second end bottom portion that communicates with said aperture of said lower housing for securing said partition second end in said interior of said trailer.

2. The partition latching system of claim 1 wherein said a pin assembly is spring biased.

3. The partition latching system of claim 2 wherein said upper housing and said lower housing are made from plastic.

4. The partition latching system of claim 3 wherein said partition is further comprised of multiple panels hingedly connected.

5. The partition latching system of claim 4 wherein said upper housing is a U shaped bracket.

6. The partition latching system of claim 5 wherein said partition is made from aluminum.

7. The partition latching system of claim 6 wherein said trailer is a horse trailer.

8. The partition latching system of claim 5 wherein said partition second end may further be secured to said trailer first sidewall.

* * * * *